(12) United States Patent
Schwendimann et al.

(10) Patent No.: US 12,391,283 B2
(45) Date of Patent: Aug. 19, 2025

(54) PROVIDING WAIT TIMES FOR PICKUPS OF PASSENGERS INVOLVING AUTONOMOUS VEHICLES

(71) Applicant: Waymo LLC, Mountain View, CA (US)

(72) Inventors: Lauren Schwendimann, Burlingame, CA (US); Donghyun Kim, San Mateo, CA (US); Connie Trinh, San Francisco, CA (US)

(*) Notice: Subject to any disclaimer, the term of this patent is extended or adjusted under 35 U.S.C. 154(b) by 135 days.

(21) Appl. No.: 18/507,169

(22) Filed: Nov. 13, 2023

(65) Prior Publication Data

US 2025/0153741 A1 May 15, 2025

(51) Int. Cl.
*B60W 60/00* (2020.01)
*G06Q 50/40* (2024.01)

(52) U.S. Cl.
CPC ..... *B60W 60/00253* (2020.02); *B60W 2556/45* (2020.02); *B60W 2756/10* (2020.02); *G06Q 50/40* (2024.01)

(58) Field of Classification Search
CPC ....... B60W 60/00253; B60W 2756/10; B60W 2556/45; B60W 50/40
See application file for complete search history.

(56) References Cited

U.S. PATENT DOCUMENTS

| | | | |
|---|---|---|---|
| 10,794,714 B2 | 10/2020 | Schwie et al. | |
| 11,493,348 B2 | 11/2022 | Levy et al. | |
| 11,692,833 B2 | 7/2023 | Chachra et al. | |
| 12,033,110 B1* | 7/2024 | Bhow | G06Q 10/08355 |
| 2015/0339928 A1* | 11/2015 | Ramanujam | G06Q 10/00 701/23 |
| 2019/0186942 A1* | 6/2019 | Rubin | G01C 21/3423 |
| 2019/0206259 A1* | 7/2019 | Yun | G01C 21/3682 |
| 2019/0297450 A1* | 9/2019 | Hwang | H04W 4/02 |
| 2019/0311629 A1* | 10/2019 | Sierra | G06Q 10/02 |
| 2021/0231445 A1* | 7/2021 | Migita | G06Q 10/025 |
| 2022/0003561 A1* | 1/2022 | Shoval | G01C 21/3415 |
| 2022/0163344 A1* | 5/2022 | Pandit | G01C 21/3682 |
| 2022/0270490 A1* | 8/2022 | Sakurada | G08G 1/096883 |
| 2022/0301430 A1* | 9/2022 | Sudo | H04N 7/183 |
| 2022/0388546 A1* | 12/2022 | Vora | G06V 20/58 |
| 2023/0101411 A1* | 3/2023 | Mirdha | G01C 21/3461 345/629 |
| 2023/0368430 A1* | 11/2023 | Czymontek | G06V 20/20 |

* cited by examiner

*Primary Examiner* — Justin S Lee
(74) *Attorney, Agent, or Firm* — Botos Churchill IP Law

(57) ABSTRACT

Aspects of the disclosure provide for wait times for pickups of passengers involving autonomous vehicles. For instance, a request for a trip identifying a pickup location may be received from a client computing device. A plurality of potential pickup locations may be identified. A subset of the plurality of potential pickup locations may be determined. A wait time may be assigned to each of the potential pickup locations of the subset. Each wait time may correspond to an estimated amount of time an autonomous vehicle can wait for the user at a respective one of the potential pickup locations of the subset. The potential pickup locations of the subset and the assigned wait times may be sent to the client computing device for display to a user.

20 Claims, 13 Drawing Sheets

PROVIDING WAIT TIMES FOR PICKUPS OF PASSENGERS INVOLVING AUTONOMOUS VEHICLES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the autonomous vehicle's surroundings. This data may be combined with pre-stored map information in order to enable the autonomous vehicle to plan trajectories in order to maneuver itself through the surroundings.

Typical transportation services which involve human drivers may provide a fixed limit for the amount of time a driver will wait (e.g., 2 minutes or more or less) independent of where the pickup is to occur. However, such systems do not involve autonomous vehicles without drivers, and a fixed value may not be realistic due to environmental factors such as congestion or impact of a vehicle stopping to pick up a passenger on congestion.

BRIEF SUMMARY

Aspects of the disclosure provide a method. The method includes receiving, by one or more processors, a request for a trip identifying a pickup location from a client computing device; identifying, by the one or more processors, a plurality of potential pickup locations; determining, by the one or more processors, a subset of the plurality of potential pickup locations; assigning, by the one or more processors, a wait time to each of the potential pickup locations of the subset, wherein each wait time corresponds to an estimated amount of time an autonomous vehicle can wait for a user at a respective one of the potential pickup locations of the subset; and sending, by the one or more processors, the potential pickup locations of the subset and the assigned wait times to the client computing device for display to the user.

In one example, the method also includes receiving a signal from the client computing device indicating a selected one of the potential pickup locations of the subset; and in response to receiving the signal, sending dispatching instructions to the autonomous vehicle in order to cause the autonomous vehicle to maneuver to the selected one to pick up the user. In another example, the method also includes, for each potential pickup location of the subset, identifying a congestion impact score corresponding to a potential impact of the autonomous vehicle stopping at the potential pickup location on traffic congestion, and wherein assigning the wait times is based on the congestion impact scores. In this example, assigning the wait times is based on a relative value of each of the congestion impact scores to others of the congestion impact scores. In addition, the potential pickup location with a highest relative congestion impact score is assigned a shortest assigned wait time, and the potential pickup location with a lowest relative congestion impact score is assigned a longest assigned wait time. In another example, determining the subset includes determining the potential pullover location of the plurality with a shortest estimated time of arrival for the autonomous vehicle. In another example, determining the subset includes determining the potential pullover location of the plurality with a shortest walking distance in time from the identified pullover location. In another example, determining the subset includes limiting a number of potential pullover locations in the subset onto a same segment of a road. In another example, determining the subset includes limiting a number of potential pullover locations in the subset that overlap with a bike lane. In another example, determining the subset includes limiting a number of potential pullover locations in the subset that are in a parking lot.

Another aspect of the disclosure provides a system comprising one or more processors. The one or more processors are configured to receive a request for a trip identifying a pickup location from a client computing device; identify a plurality of potential pickup locations; determine a subset of the plurality of potential pickup locations; assign a wait time to each of the potential pickup locations of the subset, wherein each wait time corresponds to an estimated amount of time an autonomous vehicle can wait for a user at a respective one of the potential pickup locations of the subset; and send the potential pickup locations of the subset and the assigned wait times to the client computing device for display to the user.

In one example, the one or more processors are further configured to: receive a signal from the client computing device indicating a selected one of the potential pickup locations of the subset; and in response to receiving the signal, send dispatching instructions to the autonomous vehicle in order to cause the autonomous vehicle to maneuver to the selected one to pick up the user. In another example, the one or more processors are further configured to, for each potential pickup location of the subset, identify a congestion impact score corresponding to a potential impact of the autonomous vehicle stopping at the potential pickup location on traffic congestion, and wherein assigning the wait times is based on the congestion impact scores. In this example, assigning the wait times is based on a relative value of each of the congestion impact scores to others of the congestion impact scores. In another example, the one or more processors are further configured to determine the subset by determining the potential pullover location of the plurality with a shortest estimated time of arrival for the autonomous vehicle. In another example, the one or more processors are further configured to determine the subset by determining the potential pullover location of the plurality with a shortest walking distance in time from the identified pullover location. In another example, the one or more processors are further configured to determine the subset by limiting a number of potential pullover locations in the subset onto a same segment of a road. In another example, the one or more processors are further configured to determine the subset by limiting a number of potential pullover locations in the subset that overlap with a bike lane. In another example, the one or more processors are further configured to determine the subset by limiting a number of potential pullover locations in the subset that are in a parking lot. In another example, the system also includes the autonomous vehicle.

DETAILED DESCRIPTION

Overview

Figure 1:
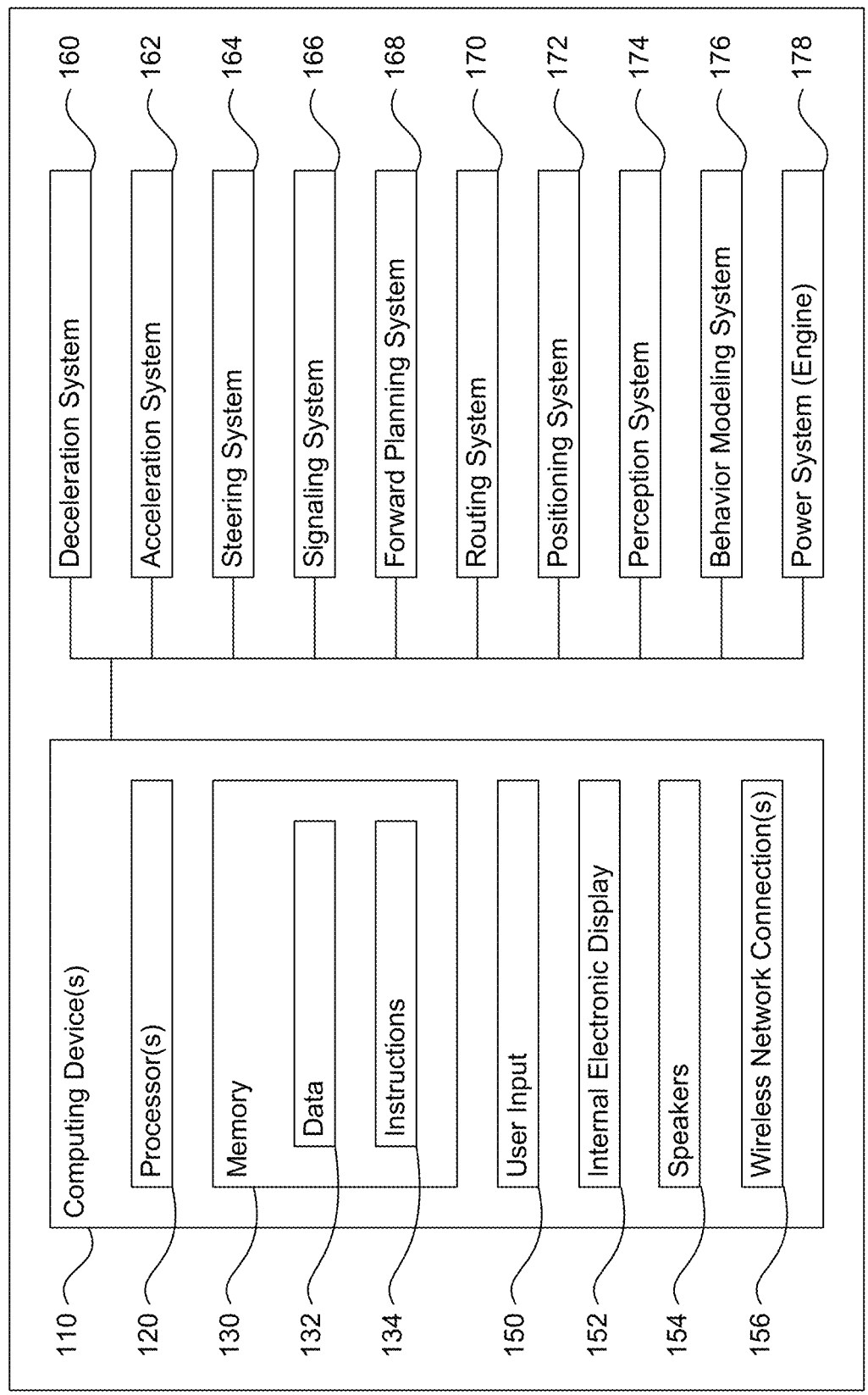
FIG. 1 is a functional diagram of an example vehicle in accordance with an exemplary embodiment.

The technology relates to providing transportation services using a fleet of autonomous vehicles and in particular, providing wait times for pickups of passengers involving such autonomous vehicles. For instance, when a user sets up a trip, the user may provide a pickup location (e.g., by entering an address, sharing location data, tapping a location on a map, etc.). One or more server computing devices of the transportation system may provide a plurality of choices for different pickup locations based on different criteria, such as shortest walking distance, fastest pickup, weather, lighting conditions, etc. This may enable the user to select a desired location for a pickup.

However such an approach may not provide the user with information about how long the autonomous vehicle will be able to wait for the user once arriving at the pickup location. As noted above, typical transportation services which involve human drivers may provide a fixed limit for the amount of time a driver will wait (e.g., 2 minutes or more or less) independent of where the pickup is to occur. However, such systems do not involve autonomous vehicles without drivers, and a fixed value may not be realistic due to environmental factors such as congestion or impact of a vehicle stopping to pick up a passenger on congestion. To address these issues, the user may be provided with additional information about each of the plurality of choices, including how long the autonomous vehicle is able to wait at any given pickup location.

In order to do so, the one or more server computing devices may first identify a plurality of potential pickup locations for an identified pickup location provided by the user. For instance, the plurality of potential pickup locations may be determined by sampling points within a proximity of the identified pickup location. A subset of the plurality of potential pickup locations may then be determined by selecting ones of the plurality of potential pickup locations.

Selecting potential pickup locations for the subset may involve determining a plurality of factors for each potential pickup location. These factors may include the estimated time of arrival of an autonomous vehicle at the potential pickup location, walking distance, fastest time to the identified destination, whether the potential pickup location corresponds to a bike lane, volume of traffic, likelihood of blocking traffic, etc. In some instances, the factors may be used to determine a cost of each potential pickup location.

The aforementioned costs of the plurality of factors for a potential pickup location may then be summed together to determine a cost for that potential pickup location. These costs may then be used to select ones of the plurality of potential pickup locations for the subset. In some instances, the different factors or scores may be weighted depending on the importance to the transportation system. In some instances, the subset may include multiple potential pickup locations with the same factors (e.g., same walking distance) or costs. In such instances, these may be deduplicated using one or more approaches.

Each of the potential pickup locations in the subset may then be assigned a wait time. The wait time may represent how long an autonomous vehicle is able to wait at a potential pickup location. In some instances, the wait times may be fixed for all pullover locations. In other instances, these may be assigned based on congestion impact scores. The lower the congestion impact score, the longer the wait time, and similarly, the higher the congestion impact score, the shorter the wait time.

A congestion impact score may be a proxy for a potential impact or how likely a particular potential pickup location is to impact traffic congestion in the area adjacent to that potential pickup location. This value may be generated using a machine-learned model. The model may be trained using training inputs such as the aforementioned pre-stored map information as well as the location and characteristics of the potential pullover location (e.g., dimensions, area, GPS coordinates of the area, etc.). Training outputs may include an obstructing traffic ratio label for the potential pullover location which may represent a congestion impact score. As such, the model may be trained to output a congestion impact score as a numerical value (e.g., 0 or greater) representative of a potential impact or how likely a particular potential pickup location is to impact traffic congestion in the area adjacent to that potential pickup location. In this regard, the greater the value of the obstructing traffic ratio label, the greater the congestion impact score.

In one example, the wait times may be assigned based on relative congestion impact scores. In another example, the wait times may be assigned based on absolute congestion impact scores. In some instances, depending upon the characteristics of the potential pickup location, a fixed value may be assigned to the potential pickup location.

Each of the potential pickup locations of the subset and the assigned wait times may be sent to the user's client computing device by the one or more server computing devices. This may provide the user with information about the trade-offs between the potential pickup locations and better enable the user to select the most optimal pickup spot for the user. In this regard, the potential pickup locations and assigned wait times may be displayed on the user's client computing device with map information also provided by the one or more server computing devices as different pickup options.

Once a user has selected one of the pickup locations, for instance by tapping, etc., the user's client computing device may send a signal to the one or more server computing devices. The server computing devices may then arrange the trip by sending dispatching instructions to an autonomous vehicle of the fleet in order to cause the autonomous vehicle to drive to the selected pickup location.

The features described herein may provide a user of a transportation server with additional information about each of the plurality of pickup choices. For instance, by providing information about how long the autonomous vehicle able to wait at any given pickup location, the user may be better able to select an optical pickup location for the user.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the autonomous vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the autonomous vehicle assists with one or more driving operations (e.g., steering, braking and/or accelerating to perform lane centering, adaptive cruise control or emergency braking), the human driver is expected to be situationally aware of the autonomous vehicle's surroundings and supervise the assisted driving operations. Here, even though the autonomous vehicle may perform all driving tasks in certain situations, the human driver is expected to be responsible for taking control as needed.

In contrast, in a fully autonomous driving mode, the control system of the autonomous vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the autonomous vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The autonomous vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the autonomous vehicle in order to control the autonomous vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the autonomous vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the autonomous vehicle. Computing devices 110 may also use the signaling system 166 in order to signal the autonomous vehicle's intent to other drivers or vehicles, for example, by lighting turn signals or brake lights when needed.

Routing system 170 may be used by computing devices 110 in order to generate a route to a destination using map information. Planning system 168 may be used by computing device 110 in order to generate short-term trajectories that allow the autonomous vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
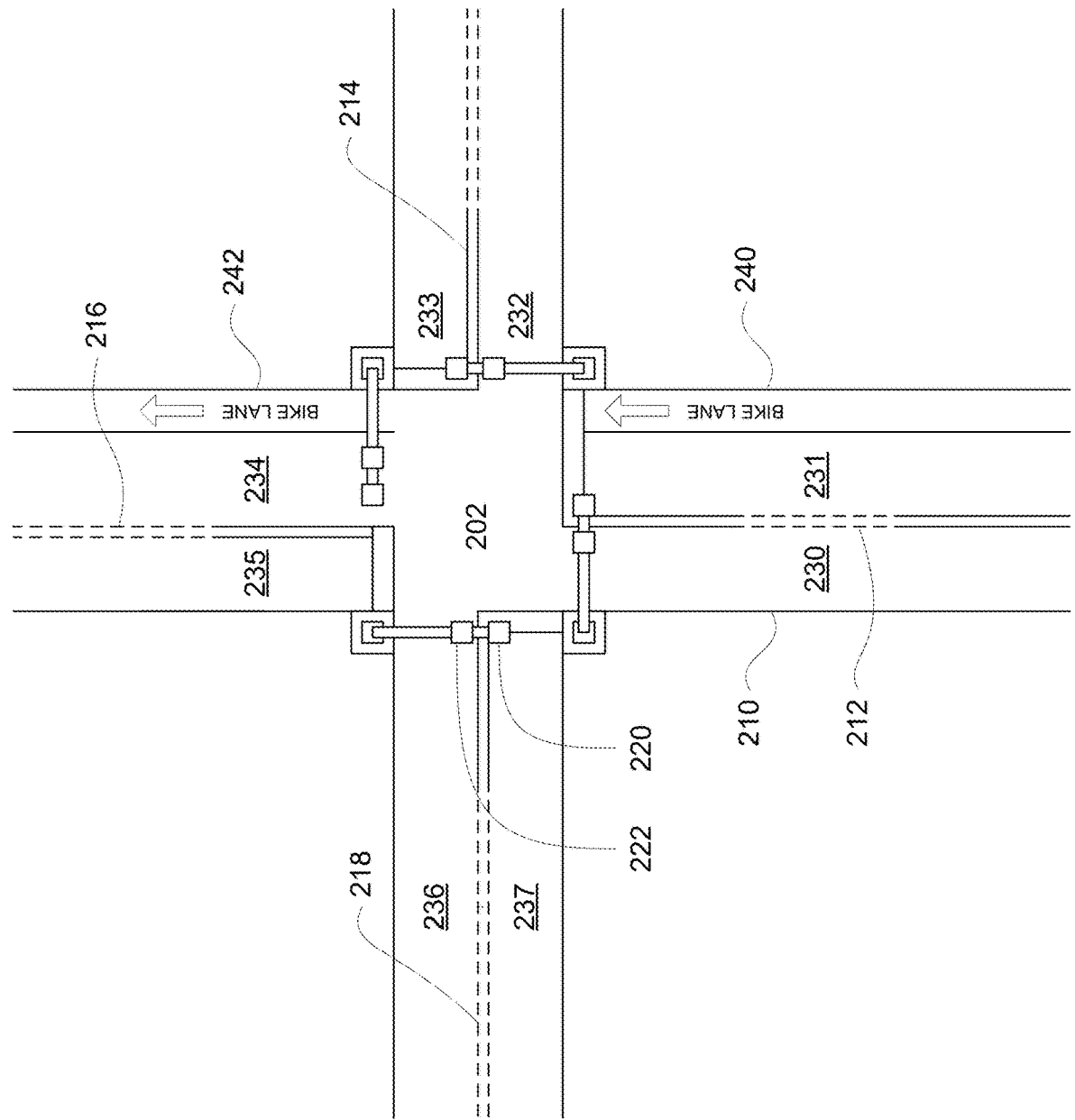
FIG. 2 is an example of map information in accordance with aspects of the disclosure.

FIG. 2 is an example of map information 200 for a section of roadway including intersection 202. The map information 200 may be a local version of the map information stored in the memory 130 of the computing devices 110. In this example, the map information 200 includes information identifying the shape, location, and other characteristics of lane lines 210, 212, 214, 216, 218 which define the shape and location of lanes 230, 231, 232, 233, 234, 235, 236, 237. The map information may also store information about the location, shape and configuration of traffic controls such as traffic signal lights 220, 222 as well as stop signs, yield signs, and other signs (not shown). The map information may also include other information that allows the computing devices 110 to determine whether the autonomous vehicle has the right of way to complete a particular maneuver (i.e. complete a turn or cross a lane of traffic or intersection).

In addition, the map information may include additional details such as the characteristics (e.g. shape, location, configuration etc.) of traffic controls including traffic signal lights (such as traffic signal lights 220, 222), signs (such as stop signs, yield signs, speed limit signs, road signs, and so on), crosswalks, sidewalks, curbs, buildings or other monuments, etc. For instance, as shown in FIG. 2, the map information identifies the shape and location of bicycle lanes 240, 242.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which edges or lanes or other mapped areas are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the autonomous vehicle, etc. Each route may include a list of a plurality of nodes and edges which the autonomous vehicle can use to reach the destination. Routes may be recomputed periodically as the autonomous vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the autonomous vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the autonomous vehicle. The location of the autonomous vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the autonomous vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the autonomous vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the autonomous vehicle is a passenger vehicle such as a minivan or car, the autonomous vehicle may include Lidar, cameras, and/or other sensors mounted on or near the roof, fenders, bumpers or other convenient locations.

Figure 3A:
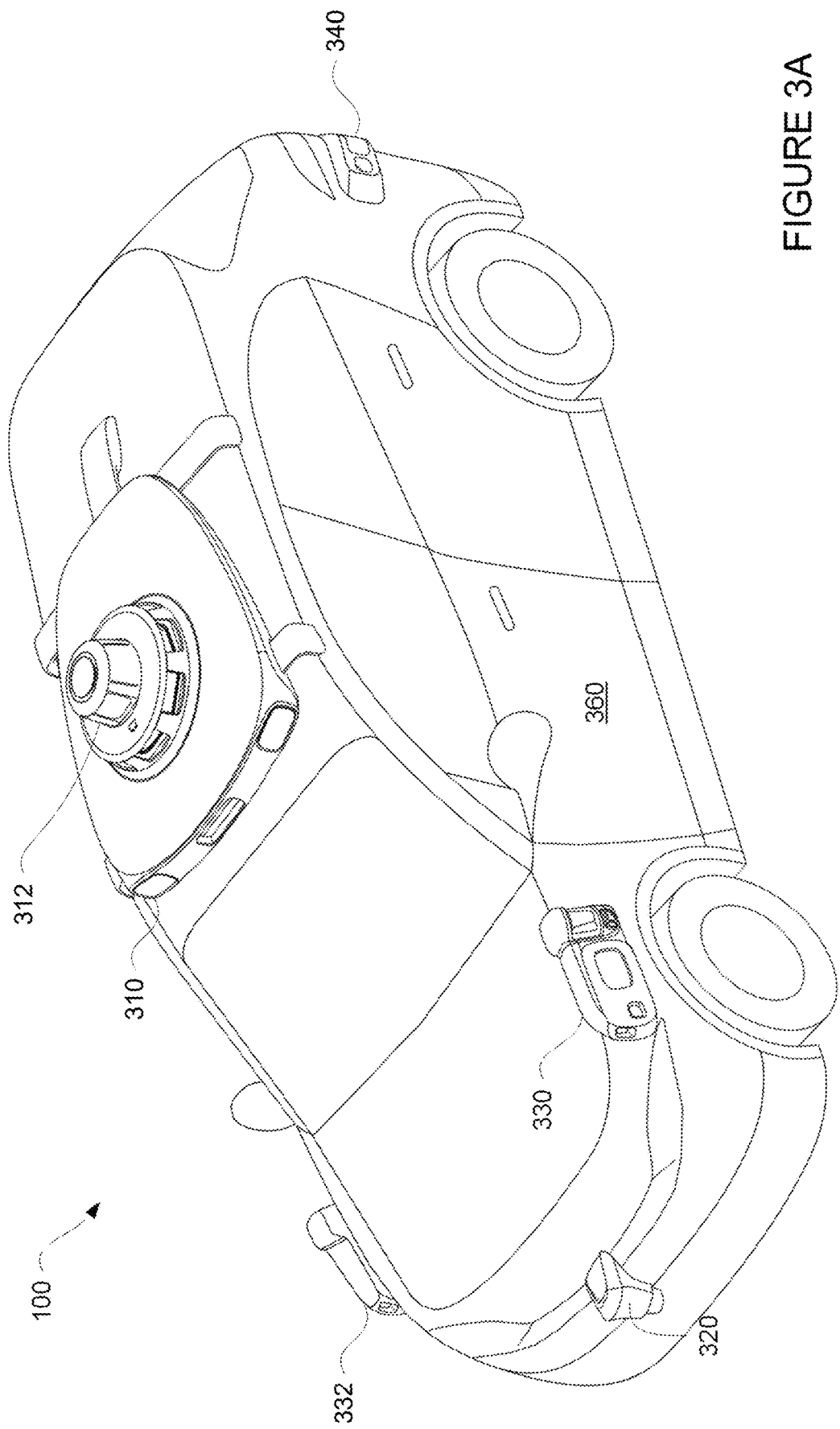
FIG. 3A-3B are example external views of a vehicle in accordance with aspects of the disclosure.
Figure 3B:
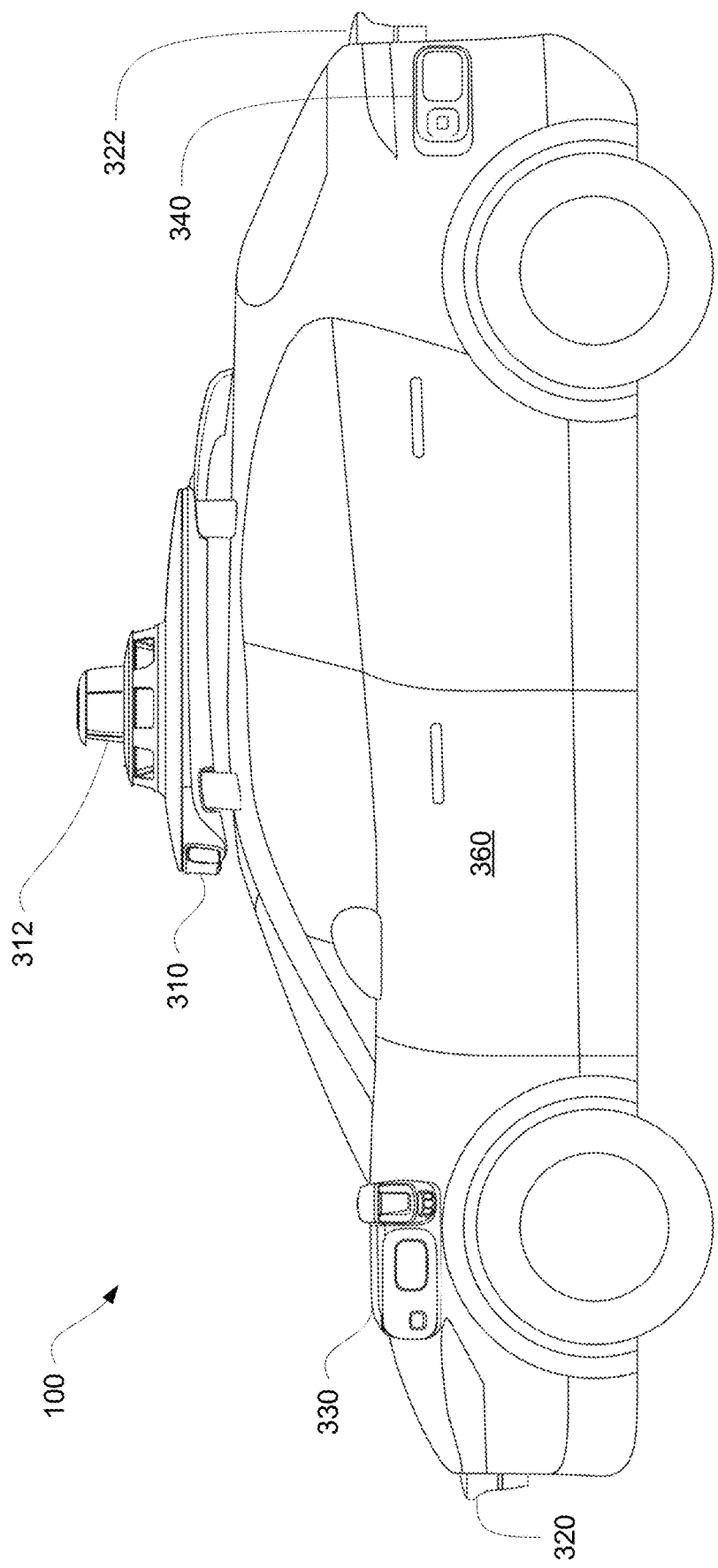

For instance, FIGS. 3A-3B are an example external views of autonomous vehicle 100. In this example, roof-top housing 310 and upper housing 312 may include a LIDAR sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the autonomous vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the autonomous vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, forward planning system 168, routing system 170, positioning system 172, perception system 174, behavior modeling system 176, and power system 178 (i.e. the autonomous vehicle's engine or motor) in order to control the movement, speed, etc. of autonomous vehicle 100 in accordance with the instructions 134 of memory 130.

The various systems of the autonomous vehicle may function using autonomous vehicle control software in order to determine how to control the autonomous vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g. future behavior predictions or predicted future trajectories). In this regard, different models may be used for different types of objects, such as pedestrians, bicyclists, vehicles, etc. The behavior predictions or predicted trajectories may be a list of positions and orientations or headings (e.g. poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the autonomous vehicle as well as an emergency vehicle detection system configured to detect emergency vehicles from sensor data generated by sensors of the autonomous vehicle. Each of these detection system software modules may use various models to output a likelihood of a construction zone or an object being an emergency vehicle.

Detected objects, predicted trajectories, various likelihoods from detection system software modules, the map information identifying the autonomous vehicle's environment, position information from the positioning system 170 identifying the location and orientation of the autonomous vehicle, a destination location or node for the autonomous vehicle as well as feedback from various other systems of the autonomous vehicle may be input into a planning system software module of the planning system 168. The planning system 168 may use this input to generate planned trajectories for the autonomous vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the autonomous vehicle to follow the route towards reaching a destination. A control system software module of computing devices 110 may be configured to control movement of the autonomous vehicle, for instance by controlling braking, acceleration and steering of the autonomous vehicle, in order to follow a trajectory.

The computing devices 110 may control the autonomous vehicle in one or more of the autonomous driving modes by controlling various components. For instance, by way of example, computing devices 110 may navigate the autonomous vehicle to a destination location completely autonomously using data from the detailed map information and planning system 168. Computing devices 110 may use the positioning system 170 to determine the autonomous vehicle's location and perception system 174 to detect and respond to objects when needed to reach the location safely. Again, in order to do so, computing device 110 and/or planning system 168 may generate trajectories and cause the autonomous vehicle to follow these trajectories, for instance, by causing the autonomous vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the autonomous vehicle and the wheels of the autonomous vehicle. Again, by controlling these systems, computing devices 110 may also control the drivetrain of the autonomous vehicle in order to maneuver the autonomous vehicle autonomously.

Figure 4:
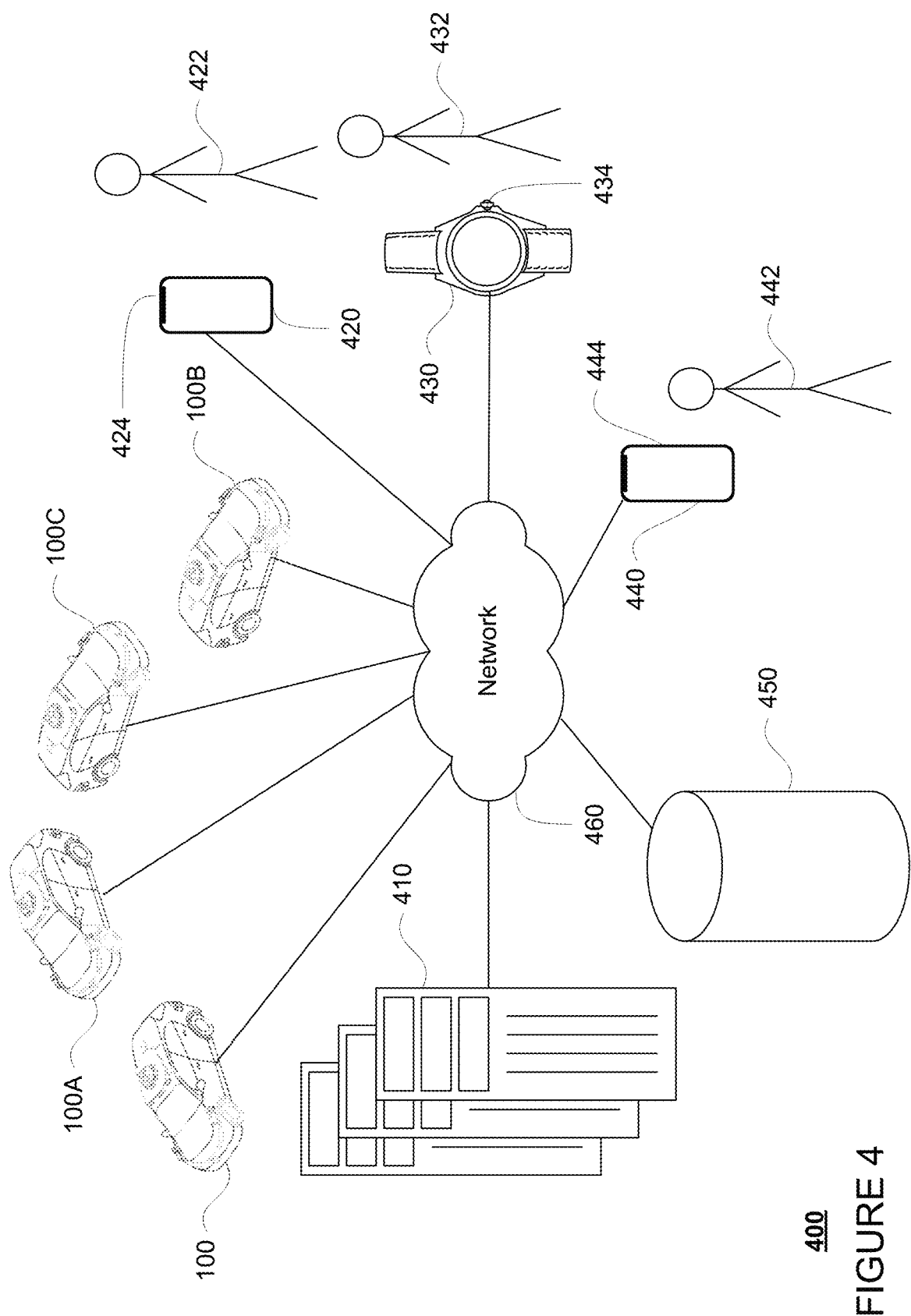
FIG. 4 is a pictorial diagram of an example system in accordance with aspects of the disclosure.
Figure 5:
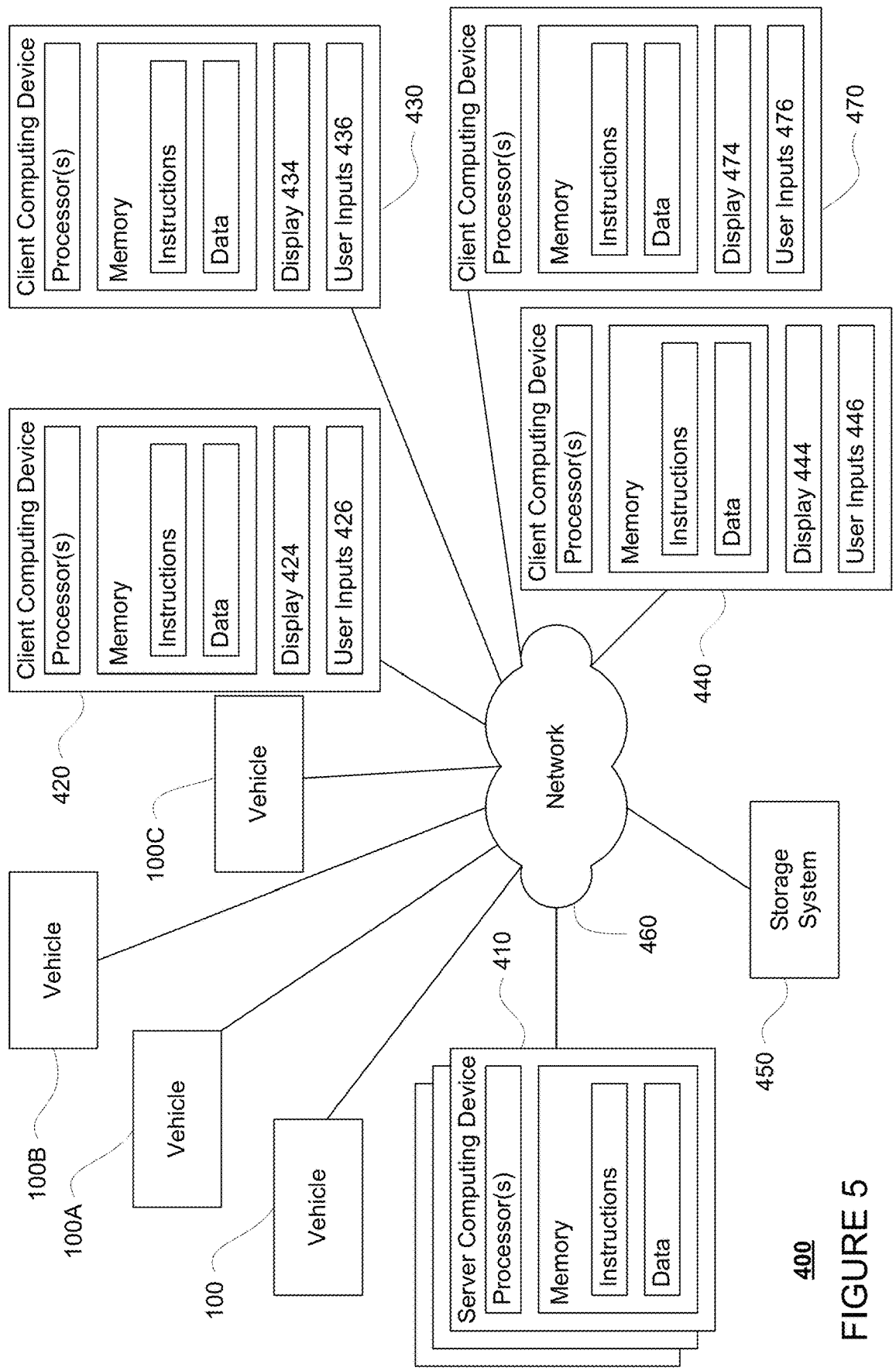
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicles 100A, 100B and 100C, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A, 100B, 100C as well as computing devices 420, 430, 440 via the network 460. For example, autonomous vehicles 100, 100A, 100B, 100C may be a part of a fleet of vehicles that can be dispatched by server computing devices to various locations.

In this regard, the server computing devices 410 may function as a fleet management system which can be used to track the status of autonomous vehicles of the fleet and arrange trips for passengers by assigning and dispatching vehicles such as autonomous vehicles 100, 100A, 100B, 100C. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of a vehicle. In other words, user 422 may represent a passenger. In addition, client computing device 430 may represent a smart watch for a passenger of a vehicle. In other words, user 432 may represent a passenger. The client computing device 440 may represent a workstation for a human operator, for example, a human operator of a depot area, a remote assistance operator, a technician who provides roadside assistance, or someone who may otherwise provide assistance to an autonomous vehicle and/or a passenger. In other words, user 442 may represent an operator (e.g. operations person) of a transportation service utilizing the autonomous vehicles 100, 100A, 100B, 100C. Although only a few passengers and human operators are shown in FIGS. 4 and 5, any number of such passengers and human operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc. Storage system 450 may store various types of information which may be retrieved or otherwise accessed by a server computing device, such as one or more server computing devices 410, in order to perform some of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 12:
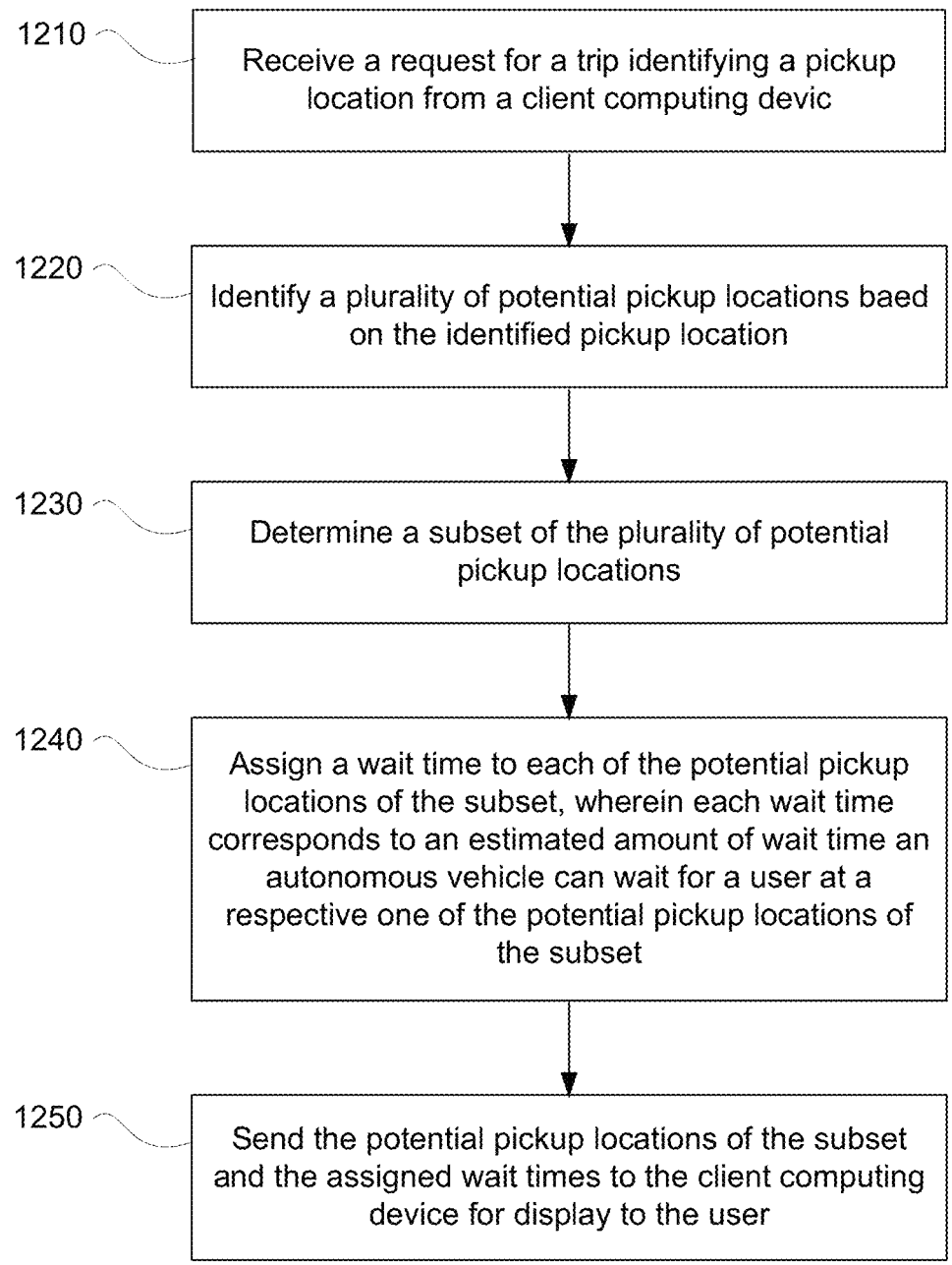
FIG. 12 is a flow diagram in accordance with aspects of the disclosure.

FIG. 12 is an example flow diagram 1200 depicting an example of providing wait times for pickups of passengers involving autonomous vehicles, which may be performed by one or more processors, such as the one or more processors of the server computing devices 410. In this example, at block 1210, a request for a trip identifying a pickup location is received from a client computing device.

For instance, a user may download an application for requesting a vehicle to a client computing device. For example, users 422 and 432 may download the application via a link in an email, directly from a website, or an application store to client computing devices 420 and 430. For example, a client computing device may transmit a request for the application over the network 460, for example, to one or more server computing devices 410, and in response, receive the application. The application may be installed locally at the client computing device.

A user, such as user 422, may input a destination location for a trip into a client computing device, such as client computing device 420, via an application, and the application may send a signal identifying the destination location to one or more server computing devices 410. This destination location may be defined as an address, a name (e.g., a business name), a type of business (e.g., a hardware store), etc. In some instances, the user may also identify one or more intermediate destinations in a similar manner.

Figure 6:
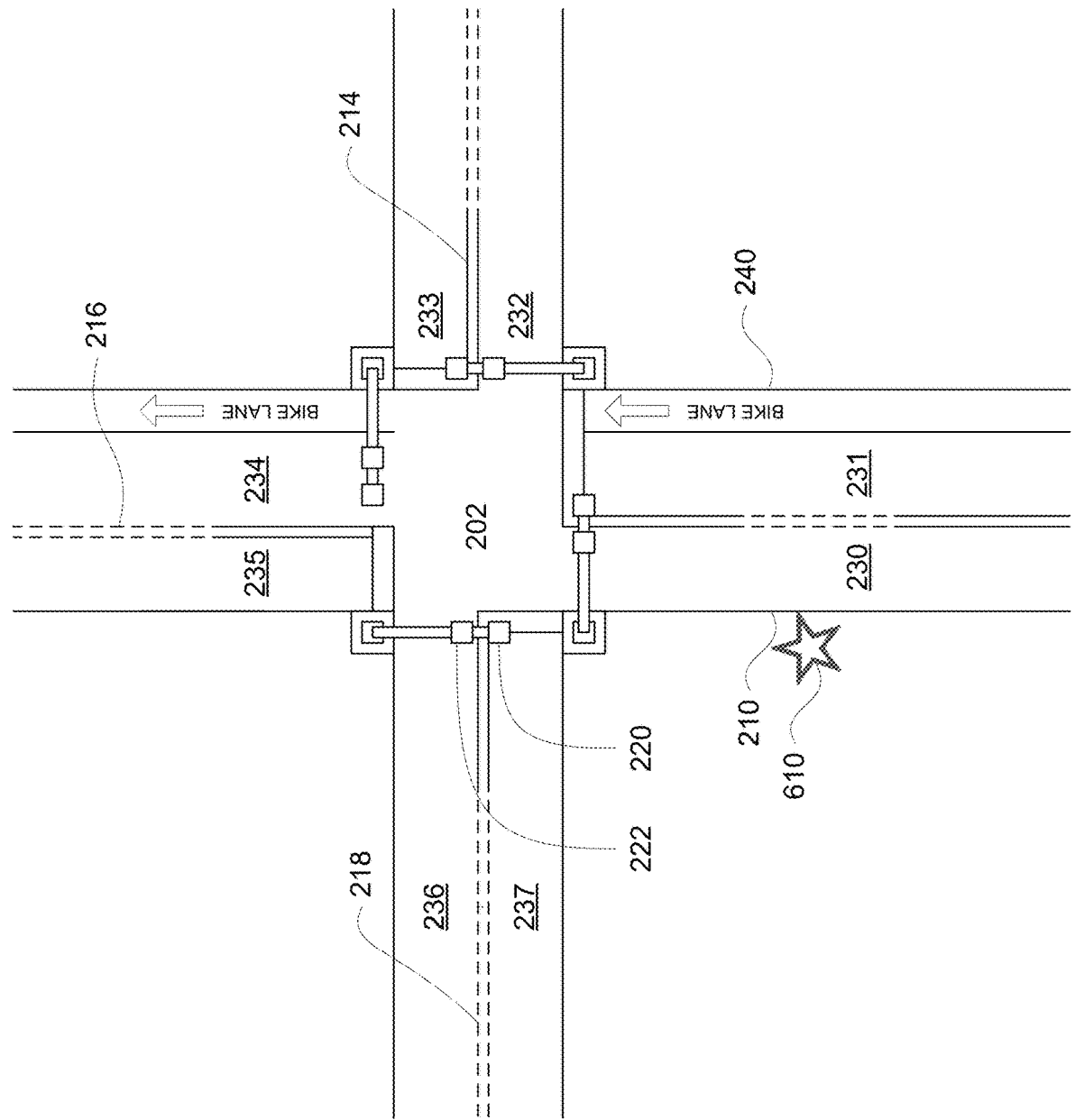
FIG. 6 is an example of map information and an identified pickup location in accordance with aspects of the disclosure.

The user may also specify or otherwise provide a pickup location at which a vehicle can pick up the user. As an example, a pickup location can be defaulted to a current location of the passenger's client computing device, but may also be a recent, suggested, or saved location near the current location associated with the user's account. The user may enter an address or other such information, tap a location on a map or select a location from a list in order to identify a pickup location. For instance, the client computing device 420 by way of the application may send its current location, such as a GPS location, and/or a name, address or other identifier for the pickup location to the one or more server computing devices 410 via network 460. In this regard, the user may share his or her current location (or other information such as accelerometer or gyroscope information generated by such devices at the client computing device) with the server computing devices 410 when using the application and/or requesting a vehicle for a trip. For example, FIG. 6 depicts the map information 200 with marker 610 representing an identified pickup location for the user.

Returning to FIG. 12, at block 1220, a plurality of potential pickup locations is identified based on the identified pickup location. In order to do so, the one or more server computing devices 410 may first identify a plurality of potential pickup locations for an identified pickup location provided by the user. For instance, the plurality of potential pickup locations may be determined by sampling points within a proximity of the identified pickup location along a curb or road edge or other reasonable location for stopping or parking a vehicle. For example, locations within intersections, as well as other potentially dangerous areas such as railroad crossings or near or overlapping with crosswalks or other pedestrian crossing areas, no stopping zones, driveways near emergency respondents such as fire stations, hospitals, or any other areas that may have safety impact to riders or pedestrians, etc. may be automatically discarded or simply ignored.

For example, a fixed number of locations (e.g., 64, 128, 512, 1024 locations or more or less), may be identified by sampling locations at fixed distances (e.g., 1, 2, 3, 4 meters or more or less) from the identified pickup location. Alternatively, rather than sampling points, if the potential pickup locations are already known (e.g., defined parking spots in a parking lot or along a roadway), the closed fixed number of such locations may be identified.

Figure 7:
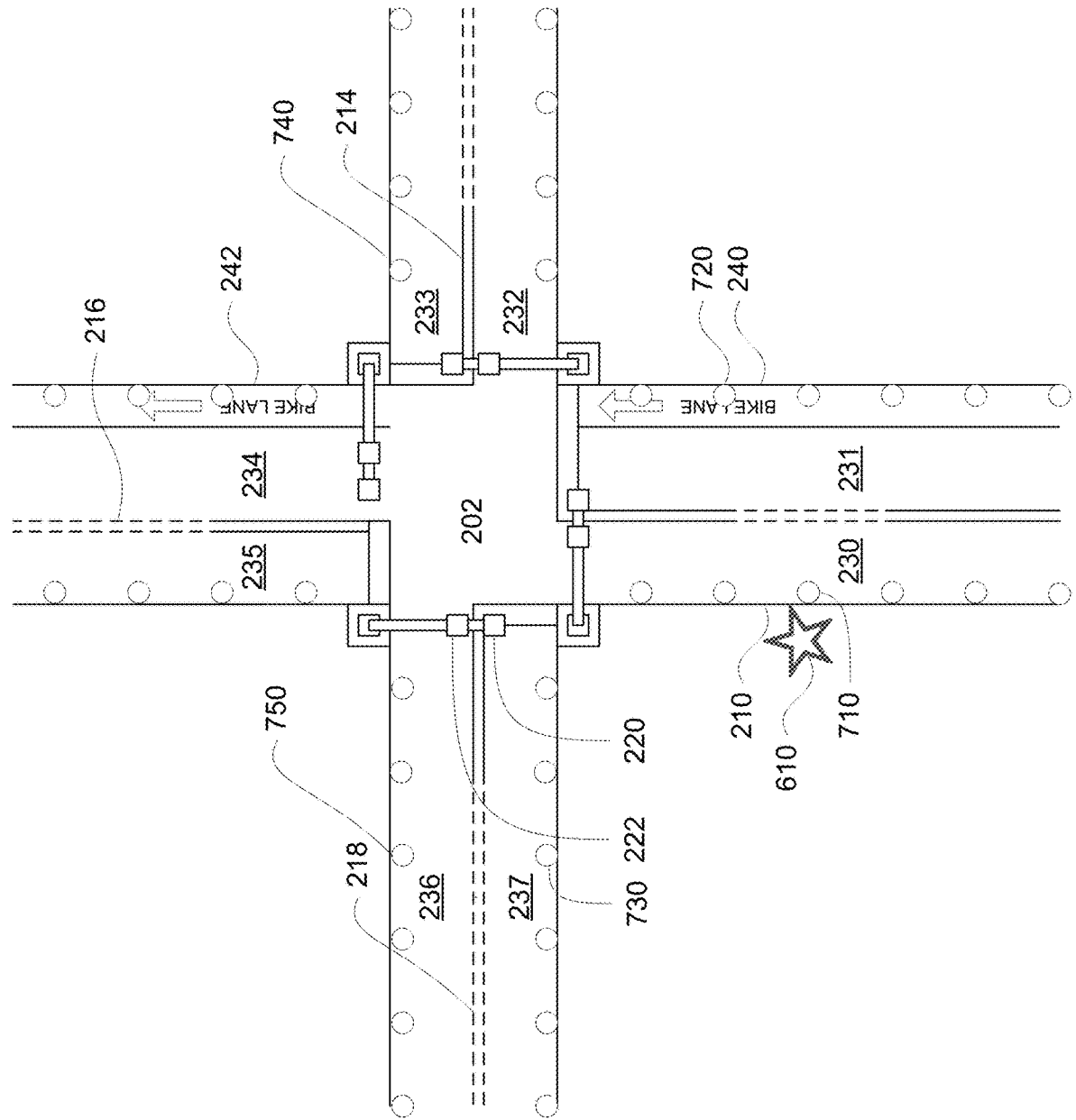
FIG. 7 is an example of map information, an identified pickup location, and a plurality of potential pickup locations in accordance with aspects of the disclosure.

FIG. 7 depicts an example of the map information 200 including the marker 610 representing the identified pickup location as well as a plurality of potential pickup locations represented by open circles, including potential pickup locations 710, 720, 730, 740, 750. In this example, the plurality of potential pickup locations is sampled at fixed distances from the location of the marker 610. As depicted herein, locations within certain areas such as near or within intersections such as intersection 202 may be automatically discarded or simply ignored.

Returning to FIG. 12, at block 1230, a subset of the plurality of potential pickup locations is determined. For instance, a subset of the plurality of potential pickup locations may then be determined by the server computing devices 410 by selecting ones of the plurality of potential pickup locations. This subset may be a fixed number, such as 3, 4, 5, or 6 or more or less potential pickup locations, which may be provided to a user's client computing device for display to the user in order to enable the user to select a final pickup location as discussed further below.

Selecting potential pickup locations for the subset may involve the server computing devices 410 determining a plurality of factors for each potential pickup location. These factors may include the estimated time of arrival of an autonomous vehicle at the potential pickup location, walking distance, fastest time to the identified destination, whether the potential pickup location corresponds to a bike lane, volume of traffic, likelihood of blocking traffic, etc.

The estimated time of arrival may be determined using the locations of a closest available autonomous vehicle of the fleet to the pickup location and estimating how long it would take that autonomous vehicle to reach the pickup location given the fastest available route. Walking distance may be determined by finding a linear (e.g., straight-line distance) or a distance along a walking path between the identified pickup location and the potential pickup location. This may be converted to an amount of time, for instance, using an estimated walking speed for a person. The fastest time to the identified destination may be determined by estimating how long it would take an autonomous vehicle to reach the identified destination from the potential pickup location given the fastest available route.

In some examples, the potential pickup location with the shortest estimated time of arrival may always be selected by the server computing devices 410 for the subset. In addition or alternatively, the potential pickup location with the shortest walking distance may always be selected by the server computing devices 410 for the subset. In addition or alternatively, the pickup location with the best combination of estimated time of arrival and walking distance (e.g., shortest values of both) may always be selected by the server computing devices 410 for the subset.

In some instances, the factors may be used by the server computing devices 410 to determine a cost of each potential pickup location. In such instances, a volume of traffic cost may be determined based on a number of vehicles expected to pass through or adjacent to the potential pickup location over some period of time (e.g., for 1 minute). For example, the potential pickup location 710 may have a volume of traffic cost based on an expectation of 10 vehicles per minute passing through the potential pickup location or the area adjacent to the potential pickup location in lane 230. In this regard, the volume of traffic cost may be "10 vehicles per minute." Such information may be determined using a machine-learned model and/or prior observations of that potential pullover location during some fixed period of time (e.g., the last 90 days or more or less). In some instances, the individual costs may be genericized to remove labels (e.g., "10 vehicles per minute" simply becomes a cost of "10").

An estimated time of arrival cost and walking distance cost may be the aforementioned amounts of time. For instance, if the estimated time of arrival of the closest available autonomous vehicle to potential pickup location 730 is "120 seconds" the estimated time of arrival cost for the potential pickup location 730 may be "120 seconds". For instance, if the walking distance either straight-line distance or a distance along a walking path between the identified pickup location and the potential pickup location would take "10 seconds", using an estimated walking speed for a person, the walking distance cost for potential pickup location 730 may be "10 seconds". In some instances, the individual costs may be genericized to remove labels (e.g., "30 seconds" simply becomes a cost of "30" and "10 seconds" simply becomes a cost of "10").

Similarly, whether the potential pickup location corresponds to a bike lane or an area outside of a parking lot may be converted to some numerical value or cost (e.g., 0 or 1, 10 or some fixed amount of time). For example, the potential pickup location 720 may also include an additional cost of "10" for overlapping with the bicycle lane 240.

The aforementioned costs of the plurality of factors for a potential pickup location may then be summed together by the server computing devices 410 in order to determine a cost for that potential pickup location. For example, if potential pickup location 720 has a walking distance cost of "40", a volume of traffic cost of "5", an estimated time of arrival cost of "120", and a bicycle lane cost of "10" the cost of the potential pickup location may be determined by summing the individual costs. In this regard, the cost of potential pickup location 720 may be 175. Similarly, if potential pickup location 730 has a walking distance cost of "30", a volume of traffic cost of "10", and an estimated time of arrival cost of "120", the cost of the potential pickup location may be determined by summing the individual costs. In this regard, the cost of potential pickup location 730 may be 160.

In some instances, the different factors or scores may be weighted (e.g. multiplied by a factor less than or greater than 1) depending on the importance to the transportation system. For example, an estimated time of arrival cost may have a higher weight than volume of traffic cost or vice versa. These weights may provide for some valuation of the importance of the different factors to the transportation system and thus may vary upon the goals and desires of each particular system. For example, some transportation systems may assign a weight of "0.1" to the volume of traffic cost and a weight of "1" to the walking distance cost, while other transportation systems may do the reverse. The potential pickup locations with the lowest costs may be selected by the server computing devices 410 for the subset.

In some instances, the subset may include multiple potential pickup locations with the same or very similar factors (e.g., same walking distance) or costs. In such instances, these may be deduplicated by the server computing devices 410 by selecting one potential pickup location per fixed distance or segment of a road. In other words as factors or costs are likely to be similar along such segments so only 1 potential pickup location for each such segment may be needed. For example, each lane in map information may be segmented into sections of a fixed distance (e.g., 5, 10, 20, 50, 100 meters or more or less) and if multiple potential pickup locations are on the same segment, those farther (e.g., in linear distance) from the potential pickup location may not be selected or may be excluded (e.g., filtered) from the subset.

In another example, deduplication may include the server computing devices 410 removing or filtering one potential pullover location when all of its individual factors and scores are inferior to another location. For example, if potential pickup location 730 has a walking distance cost of "30", a volume of traffic cost of "10", an estimated time of arrival cost of "120" and another potential pickup location 750 has a walking cost of "35", a volume of traffic cost of "10", an estimated time of arrival cost of "125", the potential pickup location 750 can be removed, because the potential pickup location 750 does not provide any benefit relative to the potential pickup location 750. Similarly, if the differences between the individual costs of two potential pickup locations are small (e.g., the estimated time of arrival is 5 seconds faster but all other costs are the same), the potential pullover location with the longer estimated time of arrival may also be removed.

Other examples of deduplication may include the server computing devices 410 limiting the number of potential pullover locations in the subset with certain characteristics. For instance, the numbers of potential pullover locations in parking lots, overlapping with bike lanes, etc. may be limited to 1 or 2 to increase diversification of the potential pullover locations.

For areas that have limited reachability for the autonomous vehicles, the server computing devices 410 may attempt to force diversification of the subset. For example, when a user needs to walk relatively far due to limited reachability in the one area, the server computing devices may also include identify potential pullover locations in the subset in another nearby area (e.g., east and west of the identified pickup location) to give some variation in the options to the user. This can be achieved by increasing the candidate pool size and/or adding a different deduplicating logic, such as hierarchical agglomerative clustering based on the vector from user's desired location to the identified pickup location, for such cases.

Figure 8:
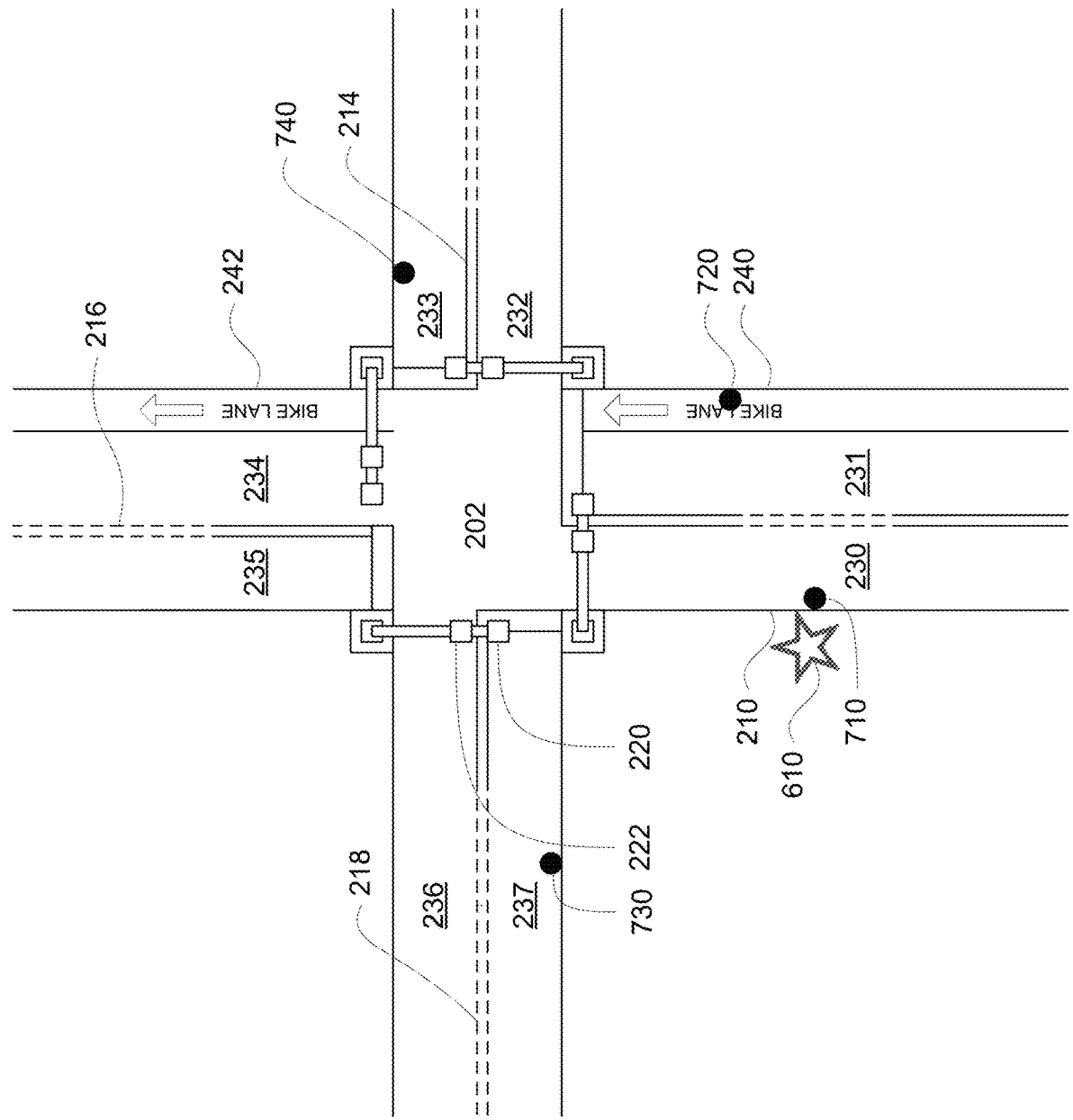
FIG. 8 is an example of map information, an identified pickup location, and a subset of potential pickup locations in accordance with aspects of the disclosure.

FIG. 8 depicts an example of the map information 200 including the marker 610 representing the identified pickup location as well as a subset of the plurality of potential pickup locations represented, including potential pickup locations 710, 720, 730, 740. In this example, the costs of potential pickup locations 710, 720, 730, 740 may be the lowest of all of the plurality of potential pickup locations. In addition or alternatively, one or more of these potential pickup location may have the lowest walking distance cost (e.g., potential pickup location 710), the lowest estimated time of arrival cost (e.g., potential pickup location 720) or a combination of the lowest sum of estimated time of arrival cost and walking distance cost. In addition, various of the other potential pickup locations represented in FIG. 7 may not be included in the subset, such as the potential pickup location 750 as described above.

Returning to FIG. 12, at block 1240, a wait time is assigned to each of the potential pickup locations of the subset. Each wait time corresponds to an estimated amount of time an autonomous vehicle can wait for a user at a respective one of the potential pickup locations of the subset. For instance, each of the potential pickup locations in the subset may then be assigned a wait time by the server computing devices 410. The wait time may represent how long an autonomous vehicle is able to wait at a potential pickup location for instance, for the user to open a door of the vehicle. In some instances, this wait time may also be intended to include time for the user to enter the vehicle and close the door. In some instances, the wait times may be fixed for all pullover locations (e.g., 2 minutes or more or less). In other instances, these may be assigned based on congestion impact scores. The lower the congestion impact score, the longer the wait time, and similarly, the higher the congestion impact score, the shorter the wait time.

In this regard, a congestion impact score may be a proxy for a potential impact or how likely a particular potential pickup location is to impact traffic congestion in the area adjacent to that potential pickup location. This value may be generated using a machine-learned model. The model may be a TensorFlow model such as a Convolutional Neural Network, Recurrent Neural Network, Long Short-Term Memory (LSTM), Restricted Boltzman Machine, Autoencoders, Self-Organizing Maps, etc. The model may be trained by the server computing devices 410 or other computing devices using training inputs such as the aforementioned pre-stored map information as well as the location and characteristics of the potential pullover location (e.g., dimensions, area, GPS coordinates of the area, etc.). Training outputs may include an obstructing traffic ratio label for the potential pullover location which may represent a congestion impact score. As such, the model may be trained to output a congestion impact score as a numerical value (e.g., 0 or greater) representative of a potential impact or how likely a particular potential pickup location is to impact traffic congestion in the area adjacent to that potential pickup location. In this regard, the greater the value of the obstructing traffic ratio label, the greater the congestion impact score.

This obstructing traffic ratio label (obstructing_traffic_ratio_label) may be defined by the following ratio:

obstructing_traffic_ratio_label=obstructing_traffic_seconds/pulled_over_seconds

The ratio of obstructing_traffic_seconds to pulled_over_seconds depicted above may be determined based on historical data (e.g., sensor data generated by a perception system) from pullovers by autonomous vehicles at different pullover locations. For instance, the amount of time in seconds that an autonomous vehicle remains stopped at a pullover location may be determined from the historical data as the value of pulled_over_seconds. The amount of time in seconds that an autonomous vehicle is obstructing other traffic may also be determined from the historical data as the value of obstructing_traffic_seconds. Whether the autonomous vehicle is obstructing other traffic may be determined based on an amount of time one or more vehicles is completely stopped within an area behind the autonomous vehicle (e.g., 10 meters behind the autonomous vehicle, 2 meters to the left and 1 meter to the right) while the autonomous vehicle is stopped in the pullover location. In this regard, if another vehicle within the area continues to move slowly within the area, this would not be counted in the value of obstructing_traffic_seconds as the other vehicle does not come to a complete stop.

If there are no vehicles within the area while the autonomous vehicle is stopped in the pullover location, the value of obstructing_traffic_seconds would be zero and the value of obstructing_traffic_ratio_label would be zero. If there is at least one vehicle within the area the entire time that the autonomous vehicle is stopped in the pullover location, the value of obstructing_traffic_seconds would be equal to the value of pulled_over_seconds, and the value of obstructing_traffic_ratio_label would be 1. To reduce complexity, the values of obstructing_traffic_seconds would pulled_over_seconds may be rounded to the nearest second.

In some instances, rather than using the aforementioned ratio, the obstructing traffic label may be one of a discretized set of labels. For example, if there is no obstruction of traffic (as in the obstructing_traffic_seconds examples described above), the value of the label may be zero. If traffic is obstructed, the value of the label may be fixed to one or more levels. For example, the greater the amount of time the greater the value. For instance, if one or more vehicles within the area is obstructed (completely stopped within the area) between 0 and 30% of the time that the autonomous vehicle is stopped, the label may be 0.1. If one or more vehicles within the area is obstructed (stopped within the area) between 30% and 60% of the time that the autonomous vehicle is stopped, the label may be 0.3. If one or more vehicles within the area is obstructed (stopped within the area) greater than 60% of the time that the autonomous vehicle is stopped, the label may be 0.6.

In some instances, the labels may include a time component. In this regard, time information may also be used to train the model so that the congestion impact score may be time-based. For example, time information may include the date, time (e.g., 8 am vs 10 pm), day of the week, season (e.g., summer, winter, fall), month, etc. of a pullover. In this regard, the training inputs may also include the time information for when the autonomous vehicle stopped in the pullover location. In this regard, when determining a congestion impact score for a potential pullover location, in addition to the map information, location and characteristics of the potential pullover location, time information for when the autonomous vehicle is expected to stop in the pullover location may also be input into the model.

The labels, including the obstructing traffic label values (and in some instances time information) may be determined and applied or otherwise associated with to the pullover location by human labelers or automatically using a similar, automated labeling process.

Thus, for each of the potential pickup locations of the subset of potential pickup locations, the server computing devices 410 may input the aforementioned map information, location and characteristics of the potential pullover location, and in some instances the aforementioned time information for when the autonomous vehicle is expected to stop in the pullover location into the trained model. For each of the potential pickup locations, the trained model may output a congestion impact score. As noted above, these congestion impact scores may then be used to determine and assign wait times for each of the potential pickup locations of the subset of potential pickup locations.

In one example, the wait times may be assigned based on relative congestion impact scores. For instance, if there are 4 potential pickup locations in the set, the potential pickup location with the lowest congestion impact score may be assigned the longest wait time (e.g., 5 minutes or more or less), the one with the highest congestion impact score may be assigned the shortest wait time (e.g., 30 seconds or more or less), the potential pickup location with the next highest congestion impact score may be assigned the next shortest wait time (e.g., 1 minute or more or less, and the potential pickup location with the next highest congestion impact score may be assigned the next shortest wait time (e.g., 2 minutes or more or less).

Figure 9:
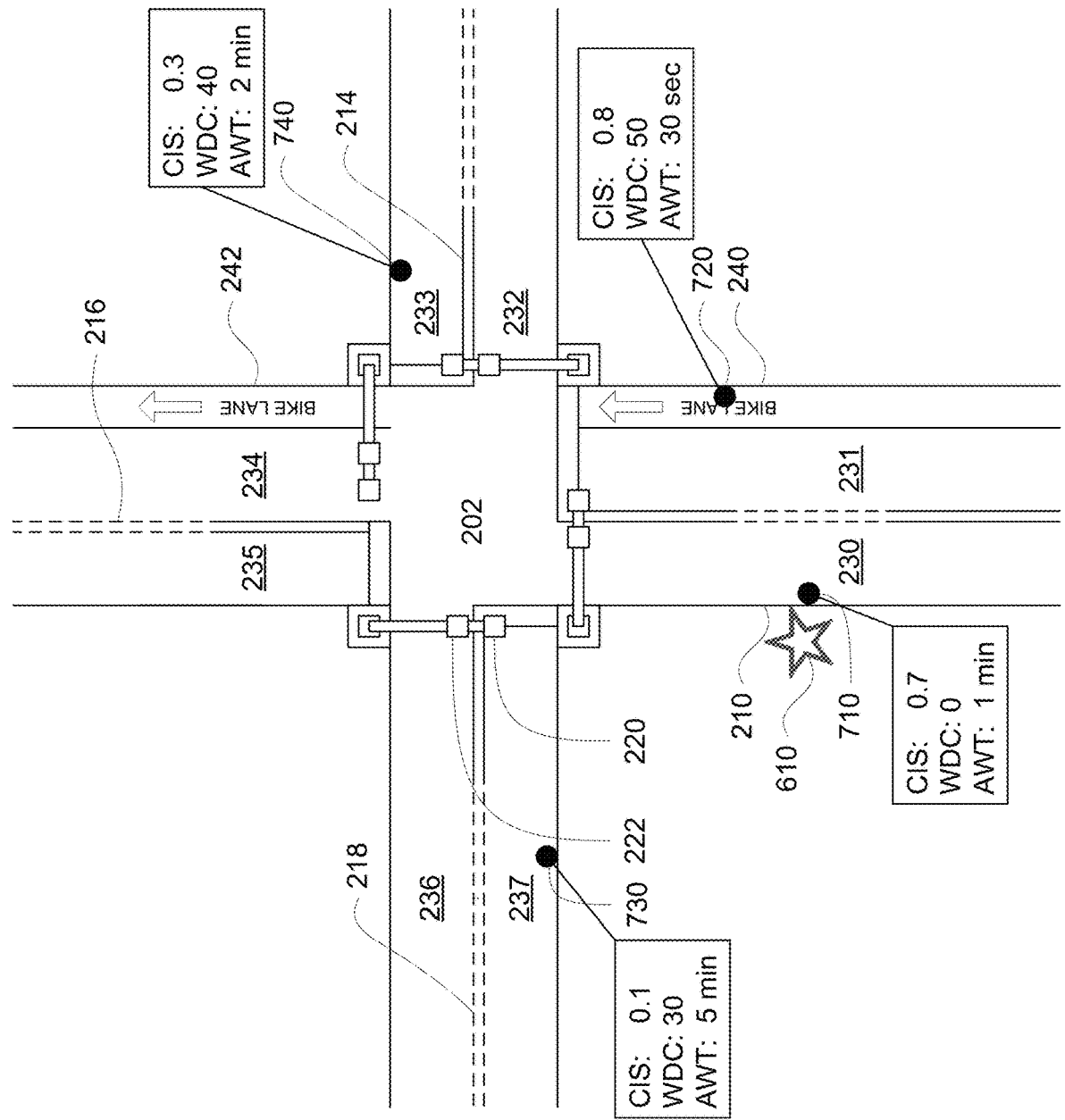
FIG. 9 is an example of map information, an identified pickup location, a subset of potential pickup locations, and additional information in accordance with aspects of the disclosure.

FIG. 9 depicts an example of the map information 200 including the marker 610 representing the identified pickup location as well as a subset of the plurality of potential pickup locations represented, including potential pickup locations 710, 720, 730, 740. In addition, for each of the potential pickup locations of the subset, FIG. 9 identifies additional information including a congestion impact score (CIS), a walking distance cost (WDC), and an assigned wait time (AWT).

As noted above, in some instances, wait times may be assigned based on relative congestion scores. For example, the potential pickup location 730 has the lowest congestion impact score (0.1), and thus, is assigned the longest wait time (5 minutes). The potential pickup location 740 has the next lowest congestion impact score (0.3), and thus, is assigned the next longest wait time (2 minutes). The potential pickup location 710 has the next lowest congestion impact score (0.7), and thus, is assigned the next longest wait time (1 minute). The potential pickup location 720 has the next lowest congestion impact score (0.8), and thus, is assigned the shortest wait time (30 seconds).

In another instance, the wait times may be assigned by the server computing devices 410 based on ranges of congestion impact scores. For example, for each range of congestion impact scores (e.g., 0 to 0.2, 0.21 to 0.5, 0.51 to 0.8, 0.81-1) a different wait time may be assigned. For instance, if the congestion impact score is 0.0 to 0.2, the wait time may be 5 minutes or more or less. If the congestion impact score is 0.21 to 0.5, the wait time may be 2 minutes or more or less. If the congestion impact score is 0.51 to 0.8, the wait time may be 1 minute or more or less. If the congestion impact score is 0.81 to 1, the wait time may be 30 seconds or more or less. In this example, returning to FIG. 9, the potential pickup location 730 has a congestion impact score of 0.1 (between 0 and 0.2), and thus, is assigned a wait time of 5 minutes. The potential pickup location 740 has a congestion impact score of 0.3 (between 0.21 and 0.5), and thus, is assigned a wait time of 2 minutes. The potential pickup location 710 has a congestion impact score of 0.7 (between 0.51 and 0.8), and thus, is assigned a wait time of 1 minute. The potential pickup location 720 has a congestion impact score of 0.8 (between 0.81 and 0.1), and thus, is assigned a wait time of 30 seconds. Of course, the actual ranges of congestion impact scores and wait times used may be determined based upon the needs of the transportation system or potentially legal requirements for stopping, parking and/or waiting in certain geographic areas.

In other instances, if the congestion impact score for a potential pickup location is too high, e.g., greater than a threshold value, the server computing devices may discard that potential pickup location. For example, potential pickup locations with congestion impact scores of greater than 0.8 may be discarded. In such instances, the remaining potential pickup locations of the subset may be assigned wait times and provided for display to a user as discussed further below. Alternatively, an additional potential pickup location may be included in the subset and provided for display to a user.

In other instances, if the congestion impact score for an identified pickup location (i.e. the pickup location requested by the user) is too high, this may act as a "trigger". For example, an identified pickup location with a congestion impact score of greater than 0.8 may act as a trigger. This trigger may cause the server computing devices to automatically perform the identification of potential pickup locations, determine the subset of potential pickup locations, and assign wait times as described above.

In some instances, depending upon the characteristics of the potential pickup location, a fixed value may be assigned to the potential pickup location. For example, all potential pickup locations that overlap with a bike lane may be assigned a fixed wait time such as 30 seconds, 1 minute or more or less. As another example, all potential pickup locations that correspond to an area of the map information identified as an airport or transportation hub (e.g., train station, bus station, or other transit location), may be assigned a fixed wait time such as 5 minutes, 4 minutes, 1 minute or more or less.

In some instances, a user may select certain preferences. For example, the system may offer a setting like "Choose pickup spots with maximum amount of wait time" or "Choose pickup spots where the car can wait at least 5 min." Such preferences may be selected by the user when setting up the application or when requesting each trip, and may be stored with account information for the user in the storage system for use and retrieval by the server computing devices. In such instances, only the first (e.g. top result of a plurality of potential pickup locations) potential pickup location may be provided to the client computing device for display to the user. This may be particularly useful for trips involving multiple users or users who may require additional time or assistance.

Returning to FIG. 12, at block 1250, the potential pickup locations of the subset and the assigned wait times are sent to the client computing device for display to the user. Each of the potential pickup locations of the subset and the assigned wait times may be sent to the user's client computing device 420 by the one or more server computing devices 410. This may provide the user with information about the trade-offs between the potential pickup locations and better enable the user to select the most optimal pickup spot for the user. In this regard, the potential pickup locations and assigned wait times may be displayed on the user's client computing device with map information also provided by the one or more server computing devices as different pickup options. In some instances, additional information about each potential pullover location, such as a walking distance (or time) from the identified pickup location. This walking distance (or time) may correspond to the walking distance or walking distance cost (in seconds) for each potential pickup location as described above.

Figure 10:
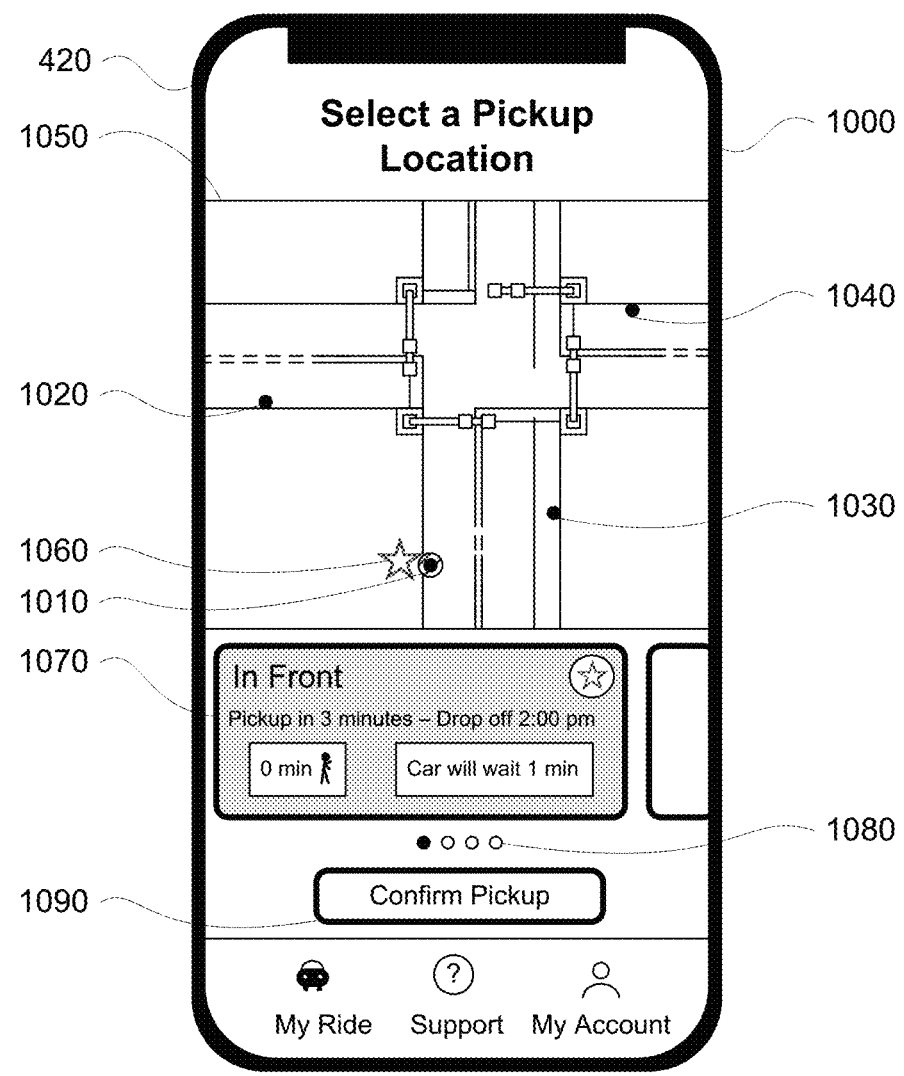
FIG. 10 is an example client computing device and displayed information in accordance with aspects of the disclosure.

FIG. 10 is an example of client computing device 410. In this example, the user is provided with information such as an instruction or notification 1000 requesting the user to select a pickup location for a trip. The subset of potential pickup locations 710, 720, 730, 740 is also displayed as represented by markers 1010, 1020, 1030, 1040, respectively. These potential pickup locations are displayed on a map 1050, corresponding to a portion of the map information 200 which may also be provide by the server computing devices 410. In this example, the identified pickup location is also represented by marker 1060. A tile 1070 includes information about a currently highlighted pickup location (here potential pickup location 710 represented by marker 1010) including the walking distance in time (0 minutes) and the assigned wait time (1 minute). In this example, the marker 1010 is represented as "highlighted" in order to indicate that the information in the tile 1070 corresponds to the potential pickup location 710 represented by marker 1010.

Figure 11:
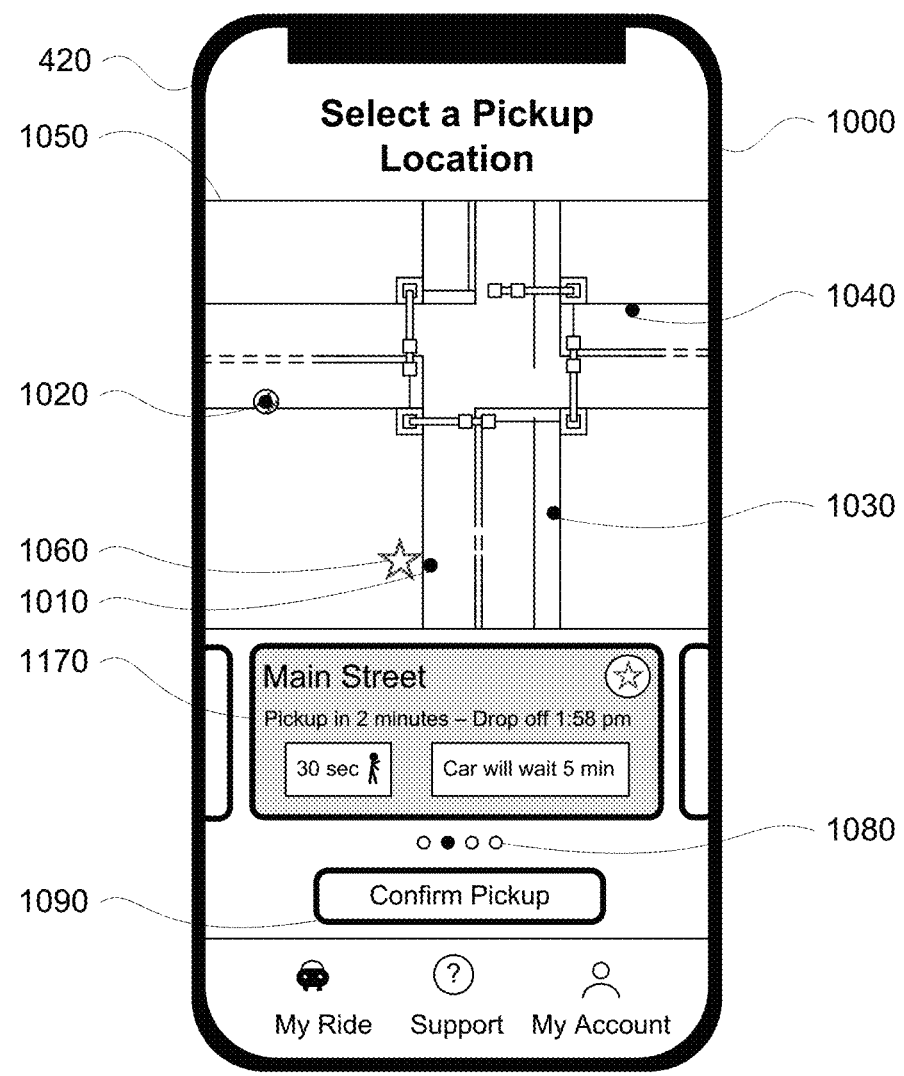
FIG. 11 is an example client computing device and displayed information in accordance with aspects of the disclosure.

In some examples, a user may swipe to view details about the different potential pullover locations or may tap on a marker on the map with similar effect. Below the tile is a series of dots 1080 representing each of the different potential pickup locations. In this example, by swiping to the right or tapping on another potential pickup location on the map 1050, the user may view information about different potential pickup locations. For example, as shown in FIG. 10, a first of the series of dots is highlighted. Turning to FIG. 11, another example of client computing device 420, a second of the series of dots 1080 is highlighted to differentiate between selected or highlighted pickup locations. In this regard, FIG. 11 depicts a tile 1170 about a new currently highlighted pickup location (here potential pickup location 720 represented by marker 1020) including the walking distance in time (30 seconds) and the assigned wait time (5 minutes).

In some instances, the additional information may include a label or name of the potential pullover locations. These may be determined from street names, addresses, or other nearby landmarks such as names of nearby businesses as well as relative positions (e.g., across from the Coffee Shoppe) which can be identified by the server computing devices 410, for instance, from information included in the map information 200. For example, as shown in FIG. 10, the tile 1070 includes the label of "In Front" to indicate that the potential pickup location is in front of the identified pickup location. In FIG. 11, the tile 1170 includes the label of "Main Street" to indicate that the potential pickup location is located on Main Street.

Once a user has selected a desired one of the potential pickup locations, the user may select an option 1090 (e.g., by tapping on a corresponding area of the display 424) to confirm the pickup location. In response to this input, the client computing device 410 may send a signal to the one or more server computing devices. The server computing devices may then arrange the trip by sending dispatching instructions to an autonomous vehicle of the fleet, such as autonomous vehicle 100, in order to cause the autonomous vehicle to drive to the selected pickup location using the one or more processors 120 and various systems described above. Once the autonomous vehicle reaches the selected pickup location, the one or more processors may attempt to identify a location to stop the vehicle and wait for the passenger. The time during which the autonomous vehicle may wait for the passenger may be the same, longer or shorter than the wait time displayed to the user for the selected pickup location (when it was a potential pickup location). In addition, in some instances, when the vehicle arrives, the autonomous vehicle (e.g., directly via a BLUETOOTH LE or other connection or via the server computing devices) may attempt to communicate with the user via the user's client computing device information about the status of the autonomous vehicle. For example, the client computing device may receive messages such as "I'll be there in 1 min," or "I'm 3 min behind, please circle the block and come back. "In the former case, if there is sufficient location data for the client computing device, the server computing device and/or the computing devices 110 may check to verify if the user is in fact close enough before waiting an additional 30-60 seconds for the user to reach the autonomous vehicle.

Although the features herein may always be used each time a user sets up a trip, providing a plurality of potential pullover locations as options (as opposed to a single, closest option) for display on the user's client computing device may be triggered by certain conditions. For instance, when an initial pickup location from the location of a client computing device (e.g., GPS location) and the GPS accuracy is low, this may trigger the processes described above. In such instances, the walking distance may be unreliable and thus ignored or given a lower weight, or additional potential pullover locations may be removed or filtered from the subset that are along the same segment or adjacent segments of a road. Similarly, when the user requests an initial pullover location in a particular type of area (e.g. residential driveway is used, disability parking is used, no suitable point was found, etc.), this may trigger the processes described above.

The features described herein may provide a user of a transportation server with additional information about each of the plurality of pickup choices. For instance, by providing information about how long the autonomous vehicle is able to wait at any given pickup location, the user may be better able to select an optical pickup location for the user.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method comprising:
   receiving, by one or more processors, a request for a trip identifying a pickup location from a client computing device;

identifying, by the one or more processors, a plurality of potential pickup locations;
determining, by the one or more processors, a subset of the plurality of potential pickup locations;
assigning, by the one or more processors, a wait time to each of the potential pickup locations of the subset, wherein each wait time corresponds to an estimated amount of time an autonomous vehicle can wait for a user at a respective one of the potential pickup locations of the subset; and
sending, by the one or more processors, the potential pickup locations of the subset and the assigned wait times to the client computing device for display to the user.

2. The method of claim 1, further comprising:
receiving a signal from the client computing device indicating a selected one of the potential pickup locations of the subset; and
in response to receiving the signal, sending dispatching instructions to the autonomous vehicle in order to cause the autonomous vehicle to maneuver to the selected one to pick up the user.

3. The method of claim 1, further comprising, for each potential pickup location of the subset, identifying a congestion impact score corresponding to a potential impact of the autonomous vehicle stopping at the potential pickup location on traffic congestion, and wherein assigning the wait times is based on the congestion impact scores.

4. The method of claim 3, wherein assigning the wait times is based on a relative value of each of the congestion impact scores to others of the congestion impact scores.

5. The method of claim 4, wherein the potential pickup location with a highest relative congestion impact score is assigned a shortest assigned wait time, and the potential pickup location with a lowest relative congestion impact score is assigned a longest assigned wait time.

6. The method of claim 1, wherein determining the subset includes determining a potential pullover location of the plurality with a shortest estimated time of arrival for the autonomous vehicle.

7. The method of claim 1, wherein determining the subset includes determining a potential pullover location of the plurality with a shortest walking distance in time from the identified pullover location.

8. The method of claim 1, wherein determining the subset includes limiting a number of potential pullover locations in the subset onto a same segment of a road.

9. The method of claim 1, wherein determining the subset includes limiting a number of potential pullover locations in the subset that overlap with a bike lane.

10. The method of claim 1, wherein determining the subset includes limiting a number of potential pullover locations in the subset that are in a parking lot.

11. A system comprising one or more processors configured to:
receive a request for a trip identifying a pickup location from a client computing device;
identify a plurality of potential pickup locations;
determine a subset of the plurality of potential pickup locations;
assign a wait time to each of the potential pickup locations of the subset, wherein each wait time corresponds to an estimated amount of time an autonomous vehicle can wait for a user at a respective one of the potential pickup locations of the subset; and
send the potential pickup locations of the subset and the assigned wait times to the client computing device for display to the user.

12. The system of claim 11, wherein the one or more processors are further configured to:
receive a signal from the client computing device indicating a selected one of the potential pickup locations of the subset; and
in response to receiving the signal, send dispatching instructions to the autonomous vehicle in order to cause the autonomous vehicle to maneuver to the selected one to pick up the user.

13. The system of claim 11, wherein the one or more processors are further configured to, for each potential pickup location of the subset, identify a congestion impact score corresponding to a potential impact of the autonomous vehicle stopping at the potential pickup location on traffic congestion, and wherein assigning the wait times is based on the congestion impact scores.

14. The system of claim 13, wherein assigning the wait times is based on a relative value of each of the congestion impact scores to others of the congestion impact scores.

15. The system of claim 11, wherein the one or more processors are further configured to determine the subset by determining a potential pullover location of the plurality with a shortest estimated time of arrival for the autonomous vehicle.

16. The system of claim 11, wherein the one or more processors are further configured to determine the subset by determining a potential pullover location of the plurality with a shortest walking distance in time from the identified pullover location.

17. The system of claim 11, wherein the one or more processors are further configured to determine the subset by limiting a number of potential pullover locations in the subset onto a same segment of a road.

18. The system of claim 11, wherein the one or more processors are further configured to determine the subset by limiting a number of potential pullover locations in the subset that overlap with a bike lane.

19. The system of claim 11, wherein the one or more processors are further configured to determine the subset by limiting a number of potential pullover locations in the subset that are in a parking lot.

20. The system of claim 11, further comprising the autonomous vehicle.

* * * * *